(12) United States Patent
Whiteley et al.

(10) Patent No.: US 7,707,076 B1
(45) Date of Patent: Apr. 27, 2010

(54) SYSTEM FOR CONTINUOUS ASSET VERIFICATION

(75) Inventors: Thomas G. Whiteley, Houston, TX (US); Wilson S. Wimberley, Houston, TX (US); Bryan Lane, Houston, TX (US)

(73) Assignee: PPI Technology Services, LP, Houston, TX (US)

( * ) Notice: Subject to any disclaimer, the term of this patent is extended or adjusted under 35 U.S.C. 154(b) by 0 days.

(21) Appl. No.: 11/761,249

(22) Filed: Jun. 11, 2007

Related U.S. Application Data

(63) Continuation-in-part of application No. 10/277,531, filed on Oct. 22, 2002, now Pat. No. 7,603,296.

(51) Int. Cl.
*G06Q 10/00* (2006.01)

(52) U.S. Cl. .............................. 705/28; 701/1; 701/213; 340/10.1; 340/10.42; 340/539.1; 340/988

(58) Field of Classification Search ............... 705/28, 705/23; 340/572.1, 572.8, 825.49, 568.1, 340/569, 10.6, 539.1, 988; 700/225, 215, 700/226; 235/385, 492; 701/213; 343/873; 379/37; 220/200
See application file for complete search history.

(56) References Cited

U.S. PATENT DOCUMENTS

| | | | | | |
|---|---|---|---|---|---|
| 4,928,299 | A | * | 5/1990 | Tansky et al. | 379/37 |
| 5,828,322 | A | * | 10/1998 | Eberhard | 340/988 |
| 5,850,187 | A | * | 12/1998 | Carrender et al. | 340/10.6 |
| 5,971,587 | A | * | 10/1999 | Kato et al. | 700/115 |
| 6,208,910 | B1 | * | 3/2001 | Michael et al. | 700/225 |
| 6,275,153 | B1 | | 8/2001 | Brooks | |
| 6,333,699 | B1 | | 12/2001 | Zierolf | |
| 6,333,700 | B1 | | 12/2001 | Thomeer et al. | |
| 6,346,884 | B1 | * | 2/2002 | Uozumi et al. | 340/572.1 |

(Continued)

FOREIGN PATENT DOCUMENTS

EP 748080 A1 * 12/1996

(Continued)

OTHER PUBLICATIONS

Qualcomm Leverages Satellites For Shipping Security. (Jul. 2002). Satellite News, 25(28), 1. Retrieved Nov. 23, 2009, from ProQuest Computing.*

(Continued)

*Primary Examiner*—Matthew S Gart
*Assistant Examiner*—Olusegun Goyea
(74) *Attorney, Agent, or Firm*—Buskop Law Group, PC; Wendy Buskop

(57) ABSTRACT

A system for continuous asset verification for at least one piece of well equipment using at least one radio frequency identification tag comprising: at least one radio frequency identification tag for removably attaching to at least one piece of well equipment; a first processor for storing information about the well equipment and for communicating the information to the radio frequency identification tag; a transportable data storage device for receiving and storing from the first processor the information; a controller comprising a second processor adapted to engage with the transportable data storage device, thereby forming a smart controller, wherein the smart controller is adapted for scanning for radio frequency identification tag at least one predefined interval to detect the information; a third processor for communicating with the transportable data storage device and storing the information.

21 Claims, 3 Drawing Sheets

U.S. PATENT DOCUMENTS

| | | |
|---|---|---|
| 6,897,827 B2 * | 5/2005 | Senba et al. ................. 343/873 |
| 7,036,729 B2 * | 5/2006 | Chung ......................... 235/385 |
| 7,277,009 B2 * | 10/2007 | Hall et al. .............. 340/539.22 |
| 2002/0185532 A1 * | 12/2002 | Berquist et al. ............. 235/385 |
| 2003/0135304 A1 * | 7/2003 | Sroub et al. .................... 701/1 |
| 2003/0149526 A1 * | 8/2003 | Zhou et al. .................. 701/213 |
| 2003/0209601 A1 * | 11/2003 | Chung ......................... 235/385 |
| 2004/0000997 A1 | 1/2004 | Stevens, III |
| 2004/0036623 A1 * | 2/2004 | Chung .................. 340/825.49 |
| 2004/0143505 A1 * | 7/2004 | Kovach ........................ 705/23 |
| 2005/0065682 A1 * | 3/2005 | Kapadia et al. ............... 701/35 |
| 2005/0248459 A1 * | 11/2005 | Bonalle et al. ........... 340/572.8 |

OTHER PUBLICATIONS

Smyrlis, Lou. (Jun. 1997). Technological leap of faith: why carriers are relying on an eye in the sky and a few microchips to better serve shippers. Canadian Transportation Logistics, 100(6), 14. Retrieved Nov. 24, 2009, from ABI/Inform Trade & Industry.*

Tom Judge. (Mar. 2002). Tracking cargo with software, on the Web. Railway Age, 203(3), 36-37. Retrieved Nov. 24, 2009, from ABI/Inform Global.*

* cited by examiner

SYSTEM FOR CONTINUOUS ASSET VERIFICATION

CROSS REFERENCE TO RELATED APPLICATION

This patent application is a continuation-in-part application that claims the benefit, under 35 USC §120, of the prior non-provisional application Ser. No. 10/277,531, which was filed Oct. 22, 2002. The prior co-pending non-provisional application is incorporated by reference along with its appendices.

FIELD

The present embodiments relate to a system for continuous asset verification using at least one radio frequency identification tag for at least one piece of well equipment and periodic scanning during transport of the well equipment.

BACKGROUND

A need exists for a system useable for verifying the safe transport of well equipment to a site that can detect changes in the contents of a shipment, deviations from a trip plan, movement of an item from beyond an electronic planned route, or "picket fence," and can reduce potential tampering of equipment, loss or destruction of equipment, and theft.

A further need exists for a system for verifying the safe storage of well equipment with an ability to detect loss or theft of one or more items using regular scanning or reading of radio frequency identification tags on well equipment.

A need exists for a system useable for continuous and automated asset verification, allowing items to be tracked at predefined intervals or continuously throughout transport and providing a report to at least one user during or at the completion of the transport.

A need exists for a system for continuous asset verification that utilizes a smart controller, able to quickly and efficiently verify and match information encoded into a removable data storage device.

The present embodiments meet these needs.

BRIEF DESCRIPTION OF THE DRAWINGS

The detailed description will be better understood in conjunction with the accompanying drawings as follows.

Figure 1:
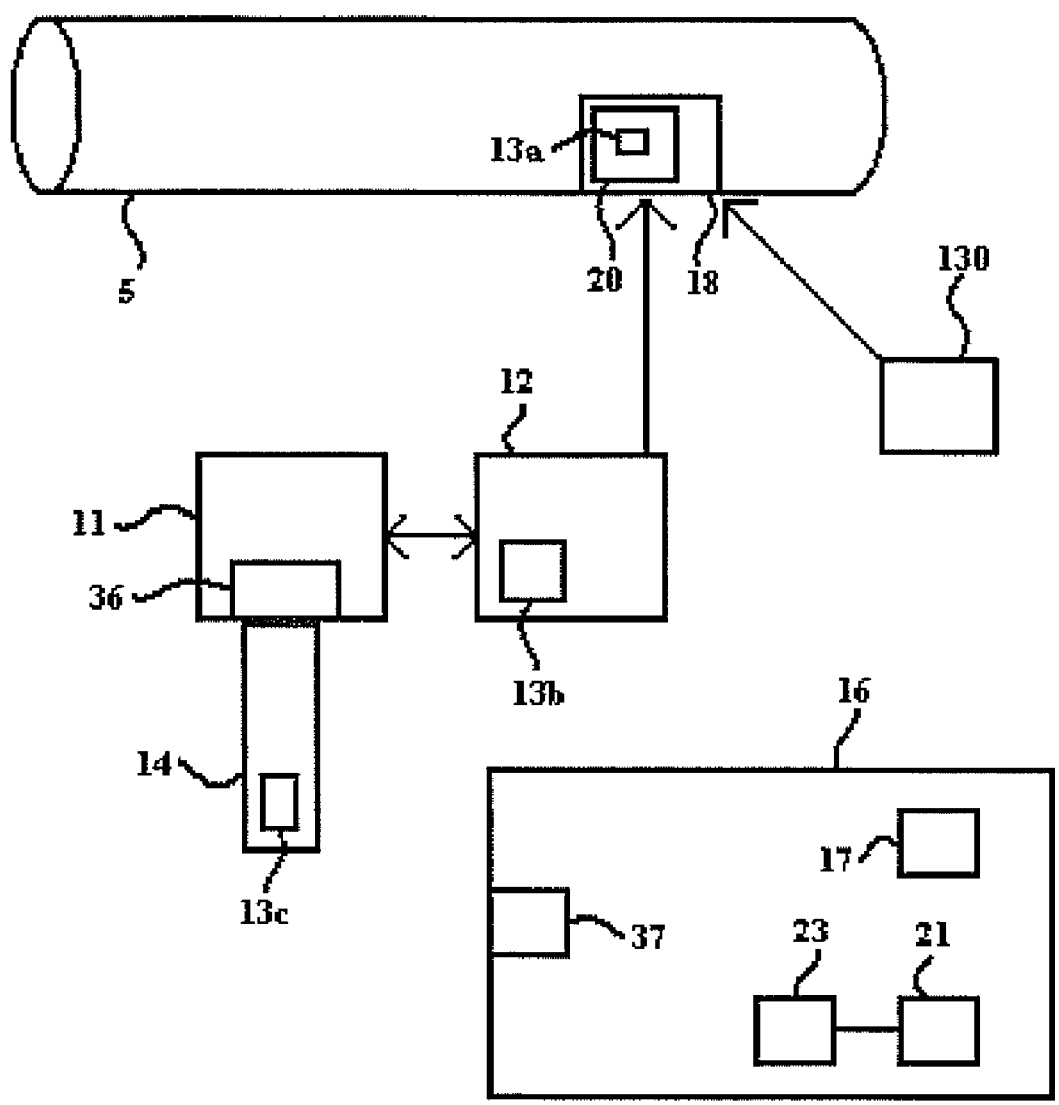
FIG. 1 depicts a diagram showing the parts of an embodiment of the present system.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

One advantage of the present system is that the present system is useable to efficiently and quickly identify well equipment and other items transported in a shipping device and verify the presence of the items at intervals during transport. The present system enables products to be processed rapidly through customs checkpoints, saving time and related shipping costs because of the ease of access of the data and the ability of the conjunctive use of a smart controller with encoded radio frequency identification tags to continuously verify the presence of and, optionally, one or more specifications of the well equipment.

The present system can be used to detect any deviation of one or more pieces of well equipment being transported from a predetermined trip plan. The present system thereby allows for the detection and prevention of tampering, unauthorized or illegal use, loss, or theft of any transported items, saving the time and costs associated with lost assets.

The present system can also be used to save lives and prevent property damage. For example, a terrorist may attempt to destroy a well site by tampering with equipment during transport, and the tampering can be detected using the present system. Additionally, a terrorist attempt to destroy a drilling rig offshore, such as by planting explosives, can be detected and prevented through use of the present system to monitor the progress of well equipment during transport or storage.

The present system additionally utilizes reusable radio frequency identification tags which can be encoded with information, then removed for future use once a piece of well equipment has reached its destination. Thus, the costs associated with the present system and all required materials are relatively inexpensive, and "environmentally friendly" while being extremely effective and efficient.

The present system is a system for continuous asset verification for at least one piece of well equipment that uses at least one radio frequency identification tag during transport, storage, when at a point of origin or destination, or combinations thereof.

The present system includes at least one radio frequency identification tag, such as an iQ8 Active Tag, made by Identec Solutions of Toronto, Canada, having radio frequency identification tag data storage. Each radio frequency identification tag can be removably attached to a piece of well equipment, thereby forming traceable well equipment. Any number of radio frequency identification tags can be attached any type or quantity of well equipment.

One or more of the radio frequency identification tags can be an active radio frequency identification tag having one or more batteries, or a similar power source, along with a means for broadcasting within a defined range, such as a transmitter.

It is also contemplated that the radio frequency identification tags can be reusable radio frequency identification tags, which conserve system operational costs and reduces the negative environmental impacts associated with other systems that do not reuse radio frequency identification tags by leaving leave them on well equipment while the equipment is run into a well.

The radio frequency identification tags can include one or more unique numbers, shipment manifest numbers, or combinations thereof for each radio frequency identification tag present in a shipment, enabling each individual radio frequency identification tag and related equipment to be uniquely identified.

The one or more pieces of well equipment can include many types of well pumps, mud pumps, and mud motors, masts for derricks, meters, and other items of manufacture.

Well equipment can include surface wellheads, manual or automatically operated outlet valves, handwheels for valves, valve actuators, blind flanges, pressure gages, spools, tees, crosses, crossover flanges, lubricators, stuffing and packing boxes, ring gaskets, slips and hangers, studs and nuts, packing materials, packers, replacement equipment such as gates and seats, valve sealent, valve stern packing, or valve release plugs.

Well equipment can further include one or more pieces of blowout preventer equipment, such as rams, control modules, inline blowout preventer units, inside blowout preventers, and blowout preventer closure members.

Well equipment can include land well structures and related parts, such as a modular land based oil derrick, casing, cement shoes, tubing, downhole packers, centralizers, cement and cementing equipment, hydraulic fracturing equipment and materials such as propellant, gelling agents, pumps, mixers, water, control units, power supplies, and storage tanks. Acidizing materials and related acidizing equipment, control units, power supplies, pumps, and storage tanks are also contemplated.

Well equipment can include one or more completion tools, such as a packer, a screen, hydraulically operated sleeves, or formation stimulation equipment and materials, such as a frac pump from BJ Services or Halliburton, both of Houston, Tex. or a drilling tool, such as a drill bit, a mud motor, or an amine scrubber.

Well equipment can further include a buoy, portions of floating rigs, or a well completion assembly, such as a well screen. It is also contemplated that well equipment can include an oil or gas rig motor, such as one made by Compressor Systems Inc of Midland, Tex., an oil or gas meter, monitor or cleaning device, such as a wireline pig made by Baker Atlas of Houston, Tex., a piece of gas compression equipment, such as a compressor and prime mover, or a generator and prime mover, such as a Hanover compressor, from various sources including Germany, which can include a portable electric generator, a piece of dehydration equipment, a heat treater, or a piece of process water equipment, such as a heat exchanger.

Wellhead equipment can also include subsea wellhead housing, including a subsea wellhead or christmas tree. Subsea wellhead caps and running and retrieving tools and equipment are also contemplated. Subsea and mudline hanger running tools, subsea rental tools including remotely operated vehicles and related equipment for valve operation, and subsea trees including subsea control valves, on-platform control equipment, and chokes are further contemplated.

Well equipment can also include manufactured raw materials, such as bars of steel, stainless steel, or nickel-based alloys, or tubulars, such as pipe and casing.

Well equipment can further include junction plates and terminations, leads and jumpers for umbilicals, mudline hanger equipment, corrosion caps and clean out tools, cameras, such as downhole cameras, remotely operated vehicle tools, and safety valves, including surface and subsurface tubing and wireline retrievable safety vales.

Possible well equipment can also include pipe joints drill pipe, or riser pipe joints, flow couplings and flow pipe, landing nipples, tubing head adapters, tree adapters, slips and pack-offs, chokes, including adjustable and positive chokes, single and double pin subs, inline ball valves, tubing hangers, measurement/logging while drilling tools (MLWD), rotary steerable systems (RSS), down hole turbines and similar power systems, stabilizers, drilling jars, and bottomhole assemblies.

Well equipment can also include storage tanks and associated equipment. Production equipment such as separators, valves, sucker rods, gas lift valves and mandrels, electric and rod-actuated rotating downhole pumps, polished rods, pumpjacks and hydraulic pumping units, prime movers, downhole sucker rod pumps, surface water pumps, downhole pump anchors, manifold equipment, water and gas injection equipment for disposal or enhanced recovery, surface towlines, and chemical injection equipment are also contemplated.

Well equipment can include components usable at surface site facilities, such as trailers, skid mounted buildings, work buildings, skid mounted generators, safety equipment, cranes and hoisting equipment, slings, welding equipment, corrosion alleviation equipment, and communication equipment are contemplated. Surface site facilities can become traceable such as managed pressure drilling skids, tanks, other skids with specialty equipment.

Well equipment can further include portions of offshore platform structures, including production and drilling risers, radio communication equipment, weather equipment, safety forecasting equipment, escape boats, engines and generator equipment, fire suppression equipment, and other similar equipment. Logging equipment, can also be traced with this system. Security equipment can be traced with this system and tracked as to its location, such as equipment for enhanced security and protection.

The present system further includes a first processor in communication with first processor data storage for storing one or more pieces of information relating to the well equipment. The first processor is also used to communicate the information regarding the well equipment to one or more radio frequency identification tags for storage in the radio frequency identification tag data storage. The first processor can be a laptop or desktop computer, or other similar devices able to communicate information to the radio frequency identification tags.

The one or more pieces of information can include a work order number, a job site address, the name of a foreman to receive an order, or similar shipping information. The information can also include freight forwarder information and other transport information, such as a planned route, email notification lists, shipment criticality level, which indicates the priority code of the shipment high, medium, low, or some other level, an average speed of travel, expected time of arrival, name of driver, name of trucking company, serial number of truck or ship, or a registration number or other identification of the truck or ship.

The information can also include serial numbers for specific pieces of pipe or equipment, or product descriptions, such as the size, weight, or color of the products.

The present system also includes a transportable data storage device for receiving and storing the information relating to the well equipment from the first processor.

The transportable data storage device can be an external memory storage device, such as a universal serial bus memory stick, an internal memory storage device, such as a computer hard drive, or combinations thereof. A Sony, Lexar, Sandisc, a PNY, a BUSLINK, a Seagate, Hitachi, a Fujitsu, a Western Digital, or another similar external memory storage device can be used herein.

It is contemplated that in an embodiment, the transportable data storage device can be adapted to be wireless, and can transmit information using e-mail and packet inter-network grouping systems, which can include IEEE standards 802.11 and 802.15 and BlueTooth™.

The present system further includes a controller that can be engaged with the transportable data storage device. The controller can be a scanner, such as a PPI asset controller, model 0001, made by PPI Technology Services of Houston, Tex.

The controller can have an environmentally resistant housing that is shock proof to two gravities, submersible to three feet, and able to withstand temperatures up to 150 degrees Fahrenheit. The housing can have a width ranging from five to fifteen inches, a height ranging from ten to twenty inches, and a depth ranging from three to nine inches. An exemplary housing can be nine inches wide, twelve inches tall, and seven inches deep. The housing should meet or exceed a NEMA 4× standard as generated by the National Electrical Manufactures Association 2007 standards.

The controller can include a power source, which can be one or more rechargeable or non-rechargeable batteries, gel cell batteries, an Odessey MC 680 dry cell, one or more wet battery packs, such as a two cell battery made by Sears, one or more solar panels, such as those from BP Solar that are small and compact, fuel cells, such as those made by Angstrom Power of Vancouver, Canada, other AC/DC sources, or combinations thereof.

The controller includes a second processor adapted to engage with the transportable data storage device, thereby forming a smart controller. The second processor can be an XScale™ processing chip from Intel, a microprocessor from Microcel, or a similar device.

The smart controller is adapted for scanning for one or more radio frequency identification tags at one or more predefined intervals, such as every thirty minutes or every six hours, to detect information in the radio frequency identification tag data storage that corresponds with the information in the transportable data storage device. The smart controller can scan the radio frequency identification tags continuously during transport or storage, very frequently, very infrequently, or at any intermediate interval.

It is contemplated that the smart controller can scan or read specific radio frequency identification tags relating to the information on the transportable data storage device. The smart controller can also retrieve information from the RFID tags, convert information from the RFID tags, monitor new RFID tags added to a shipment, provide reports on information from the RFID tags, determine the current location of the smart controller using a global positioning system device, provide notices and alarms by e-mail, cellular networks, and other devices, BlueTooth networks, or other information transfer systems, including the Internet, and can sense shock or vibrations during transport using an accelerometer, such as those made by Fisher Scientific, having an office in Houston, Tex.

It is also contemplated that the controller's second processor can have memory with sufficient capacity to contain a copy of the information being loaded and contained on the transportable data storage. It is contemplated the controller's memory can include at least one megabyte of data storage.

In an embodiment, the radio frequency identification tags can be tamper resistant, for added security and durability. A tamper resistant RFID tag would be one, such as those made by AeroScout of San Mateo, Calif. The invention specifically contemplates using reusable resettable RFID tags.

In another embodiment, the controller can be used to prevent tampering with the RFID tags using an internal or external alarm or emergency notification system, wherein the controller can call or contact a user or administrator, send a text message, or send email using a cellular network when the well equipment is moved or when the well equipment deviates from the trip plan. Similarly, a contact switch can be installed on the RFID tags to provide an alarm to the controller when the well equipment is moved or if the RFID tag is removed from the equipment.

In yet another embodiment, it is contemplated that the radio frequency identification tags can be serialized, and the serial numbers can be recorded in the transportable data storage associated with the controller, to provide two simultaneous confirmations of the encoded RFID tags at a storage or delivery site after transport. This simultaneous confirmation is an unexpected benefit, that allows for rapid verification of a load, and that is faster than verifications performed in a sequential manner.

The present system further includes a third processor, which can be a laptop computer in the field, a desktop computer, or another similar device, for communicating with the transportable data storage device and storing the information relating to the well equipment. The information in the transportable data storage can be accessed by the third processor to verify the successful transport of traceable well equipment without deviation, loss, or tampering.

In an embodiment, the third processor can have in memory, or the transportable data storage device can contain, additional computer instructions for instructing the third processor to generate a report relating to the information for use by another party, such as a foreman, a user, or an administrator at the site or at a remote location. This report can be transferred by satellite or another kind of network for use by a plurality of users connected on a network.

The third processor can be located at the destination site or at an intermediate site. It is contemplated that the third processor can be in any location and be in wireless communication with the smart controller, such as via a cellular network, wherein the third processor can call the smart controller over a cellular network, as one would phone another cellular device.

It is contemplated that one or more radio frequency identification tags can be encoded with information relating to well equipment by another external device, external RFID reader-writer, hand held or otherwise, or the first processor, while the first processor simultaneously or sequentially communicates the information to the transportable data storage device. It is also contemplated that the first processor can communicate the information to the transportable data storage device, which can be engaged with the controller, and the controller can communicate the information to the radio frequency identification tags.

The encoded radio frequency identification tags can then be attached to the related well equipment and transported with the smart controller. The smart controller can detect and store the information at one or more predefined intervals, such as every hour, on the hour, during transport.

The traceable well equipment and the smart controller can be transported to a site in a shipping device, such as an equipment basket or a shipping container that meets a standardized shipping ASTM size of eight feet by forty feet, an ISO standard, and other containers for a truck, a ship, an aircraft, a train, or other similar transportation means. A shipping device can meet an API 8C standard, as indicated by the 2007 American Petroleum Institute standards. The shipping device should meet a defined shipping size and standard, such as the standards stated in the British standard, BS EN 12079, or the international standard DNV 2.7-1.

The shipping device can include a shipping module, a box, a crate, a basket, or a standardized intermodal shipping container. Any number of identical or different kinds of shipping devices can be used to transport any quantity or type of well equipment.

The controller can include a mounting bracket sensor located on a mounting bracket, that can be used to secure the smart controller to one or more of the pieces of well equipment for added stability and security.

The mounting sensor can include a contact switch or proximity sensor. The mounting bracket can be the same size as the controller housing, or slightly larger or smaller, such as +/−30% in size.

Destination sites can include well locations having one or more hydrocarbon wells, water wells, injection wells, such as disposal wells, enhanced recovery injection wells, tertiary recovery wells, and combinations thereof.

Destination sites can include work sites, such as sites with assembled parts for unfinished wells, or manufacturing locations or assembly locations, such as locations where well parts are manufactured or assembled.

It is also contemplated that a destination site can include a storage area for long term storage, a holding area for short term storage, or a transport vehicle, such as a ship, boat, barge, train, car, truck, or aircraft.

It is contemplated that the present system can be used in conjunction with a toll service or border inspection service, so that trucks can move, in the manner of an "EZ PASS"™ across state lines, enabling truckers to continue driving without stopping at a border station. In this embodiment, the third processor can be a government processor that reads the RFID tags, or the smart controller can transmit the information relating to the well equipment to the third processor at a border station or government agency site, enabling fast transport of the well equipment without additional paperwork or additional stopping. This is a noteworthy advantage of the present system.

In an embodiment, the present system can include a fourth processor for receiving the information from the smart controller simultaneously or sequentially with the third processor. The fourth processor can be remote from the site while the third processor is located on site. The fourth processor could be a laptop computer, a desktop computer, a cellular telephone phone having an operating system disposed therein that can engage a network, a personal digital assistant, a palm top computer, or a similar device for connecting to the network and processing data.

The third processor and the fourth processor can be connected by a network so that the smart controller can communicate between the third processor and the fourth processor instantaneously. It is contemplated that any number of processors, located on site or remote from the site, can be in communication with the smart controller or with each other processor via a network. For extremely fast conveyance of information, it is contemplated that the smart controller can communicate to the third and fourth processors through two different gateway protocols simultaneously.

The fourth processor can be remote from the smart controller or the transportation route, such as at a home office of a manager in communication with the smart controller through a wireless, cellular, or a satellite link. The fourth processor can also be located at the site for directly connecting to the smart controller for receiving the information relating to the well equipment.

In a contemplated embodiment, the fourth processor can include computer instructions for permitting one or more customers to access the information while the well equipment is in transit, storage, at a point of origin or destination, or combinations thereof.

It is also contemplated that the fourth processor can include additional computer instructions for providing a shipping status to customers, a map presentation of a location of the traceable well equipment, an e-mail notification to a recipient list based on priority codes, or combinations thereof.

In a contemplated embodiment, the information relating to the well equipment can be a limited amount of information for a fast communication between the smart controller and the third processor, as well as a fourth processor located remote from the well equipment, such as at a centralized location that can be a site or office of an administrator of the transport process, which can be miles from the well site. Any combination of remote or on-site processors can be in communication and receive the limited information from the smart controller.

The limited information can include from three to five components of information, such as a part number, size of equipment, job number, serial number, brand name, color, material, chemical composition, other similar information, and combinations thereof.

The limited information could include, in another embodiment, from one to 100 or more distinct pieces of information. The "limited information" is only limited by the amount of data each radio frequency identification tag can hold, and the number of RFID tags used in performing the present method. Any number of RFID tags could be used to label a piece of well equipment. As processing and data storage capacity increases, the quantity of data or pieces of information that is quickly transferable will also increase. It is contemplated that the limited information installed on the RFID tags is limited only to facilitate very rapid transfer, in fewer than ten minutes, more preferably in fewer than three minutes, and even more preferably in fewer than two minutes.

It is also contemplated that the information can include a trip plan relating to the well equipment. A trip plan is a predetermined route, including stopping places, fueling stops, hotels for the driver, maintenance stops, additional pick up locations, airport load and offload zones, train load and offload areas, ports, ship deck locations, origin and destination locations, allocated time per segment and allocated overall time of the trip, and combinations thereof.

In an embodiment, the smart controller can include a global positioning system transceiver such as a Garmin™ GPS or a Tom Tom™ GPS, a radio frequency identification reader-writer such as an Identec reader writer, and combinations thereof.

Data storage in the smart controller or the transportable data storage device can include computer instructions for instructing the second processor of the smart controller to use the global positioning system transceiver to synchronize coordinates received by the global positioning system transceiver to the trip plan. The second processor of the smart controller can then provide at least one time stamp including a time and set of coordinates for the well equipment during transport.

The smart controller can further include a universal serial bus interface, a wireless transmitter-receiver for communication with one or more networks, and combinations thereof. Possible networks can include but are not limited to a local area network, a wide area network, the internet, a cellular network, a wireless network, including Wi-Fi, or a satellite network. The smart controller can communicate with the global positioning system transceiver and the radio frequency identification reader-writer using one or more networks, the universal serial bus interface, or any combinations thereof.

It is further contemplated that the data storage in communication with the third processor can contain computer instructions for instructing the third processor to provide a notification to a user that the RFID tagged well equipment has deviated from the trip plan. The notification can include one or more e-mails, cellular calls, alarms, textual messages, other similar notifications, and combinations thereof.

In an embodiment, the smart controller or the transportable data storage device can also include computer instructions for instructing the second processor to create a map of a trip route using the trip plan. The smart controller can be used for locating the smart controller using a mapping software program, such as Google Maps™, OnStar™, or Terraserver maps. In an embodiment, the computer instructions can instruct the second processor to use one or more priority codes in mapping a trip route. For example, certain high priority shipments may be provided with a map of a faster trip route having fewer stops.

The smart controller or the transportable data storage device can also include computer instructions for instructing the second processor to implement a standby or sleep mode to conserve power. During a standby or sleep mode, the smart controller can be placed in a state of minimal power consumption, where only the minimal functions required to reactivate the smart controller at the next instance when the radio frequency identification tags are to be scanned are maintained. The sleep or standby mode is especially useful when the smart controller is used to scan the radio frequency identification tags at infrequent intervals over a long duration.

In a contemplated embodiment, the radio frequency identification tags can include shipping device (or shipping basket) data, which can include job numbers, scanner numbers, global positioning system coordinates with time and date stamps, key locations that are passed through during shipment, and other similar information.

The radio frequency identification tags can also include shipping device status flags and payload status flags. Shipping device status flags can indicate whether a shipment is outbound, arrived, or inbound. Payload status flags can indicate whether a payload is secured and untouched, or whether a shipment has potentially been breached. The radio frequency identification tags can also include a status flag that indicates whether any errors have occurred in the system. Other shipping device and shipment data can also be included in the radio frequency identification tags.

Referring now to FIG. 1, a diagram of the parts of an embodiment of the present system.

FIG. 1 depicts well equipment (5) having a radio frequency identification tag (18) attached thereon. While well equipment (5) is depicted as a single tubular, well equipment (5) can be any type or quantity of well equipment or structures that can be transported to a site.

Radio frequency identification tag (18) has radio frequency identification tag data storage (20), which when encoded contains information (13a) relating to well equipment (5) forming traceable well equipment.

A first processor (11) is shown in communication with first processor data storage (12). First processor data storage (12) contains information (13b) relating to well equipment (5). Information (13a) is the same as Information (13b). The first processor (11) further has at least one universal serial bus interface (36), which can be another removable data storage interface, for connecting to the transportable data storage (14).

A controller (16) is shown in communication with a power source (17), which can be any kind of power source including AC/DC power sources, one or more rechargeable or non-rechargeable batteries or fuel cells, a solar battery, or other similar power sources.

Controller (16) is also shown in communication with a second processor (21) having memory (23) for communication with a removable data storage interface (37) for engaging the transportable data storage (14) which is shown in this Figure engaging the first processor (11). The transportable data storage (14) has engaged the first processor (11) and received the information (13b). Information (13b) is contemplated to be a copy of information (13a) stored on the radio frequency identification tag (18).

Transportable data storage (14) is shown containing information (13c) relating to well equipment (5) which is a copy of information (13a) stored on the radio frequency identification tag (18) and a copy of information (13b), stored in data storage (12).

FIG. 1 also shows a fifth processor (130) that can be used for loading the at least one piece of information onto the at least one radio frequency identification tag.

Figure 2:
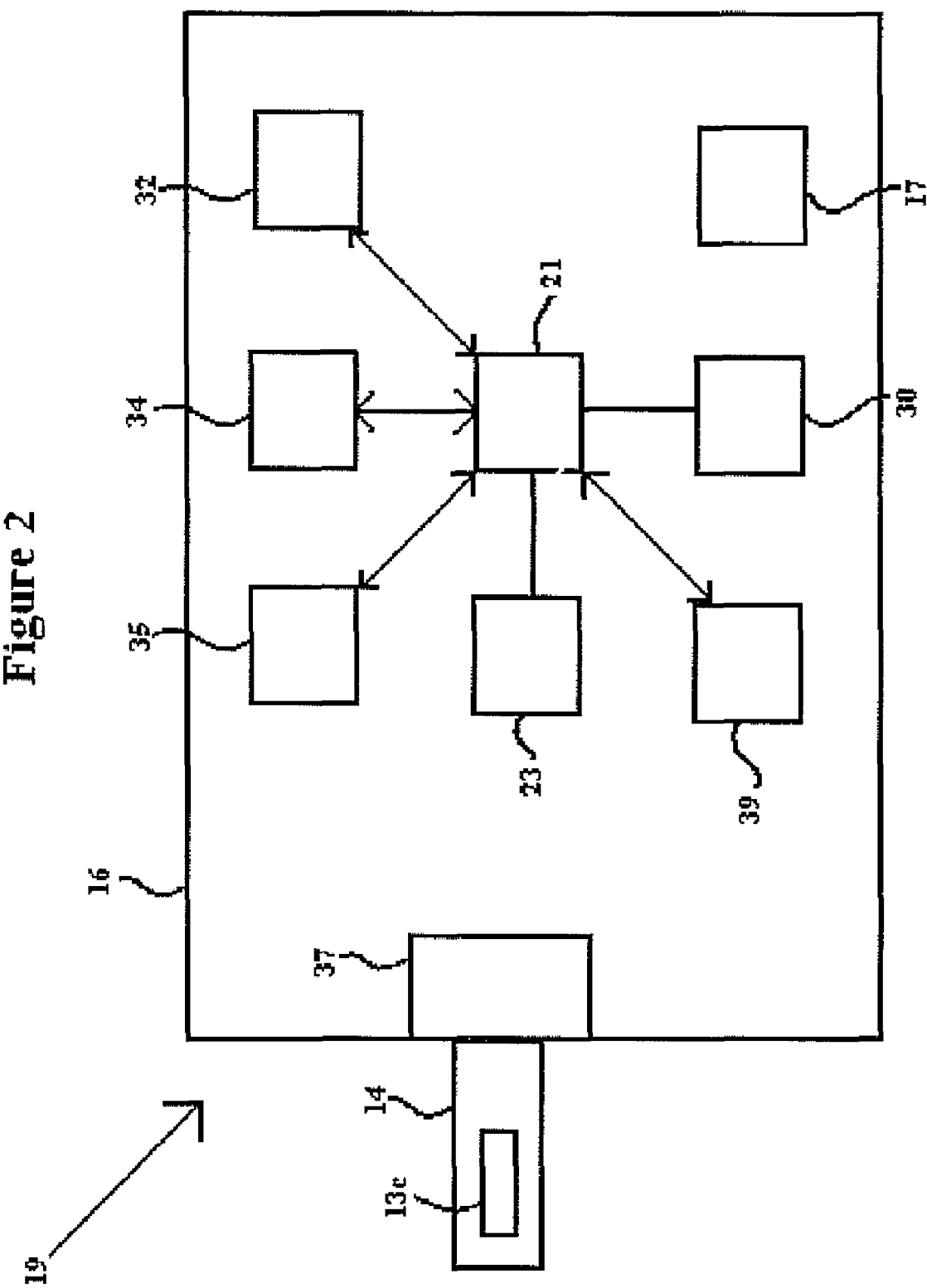
FIG. 2 depicts a diagram showing selected parts of the system of FIG. 1 assembled to form a smart controller.

Referring now to FIG. 2, a diagram is shown, depicting selected parts of the system of FIG. 1 assembled to form a smart controller (19).

Smart controller (19) is formed when controller (16) engages the transportable data storage (14) containing the information (13c) relating to the well equipment.

The smart controller (19) can contain a GPS transceiver (30), a RFID reader/writer (32), a satellite transmitter/receiver (34), or any combinations thereof. A cellular transceiver (35) is depicted within the smart controller (19). Each component within the smart controller (19) is in communication with the second processor (21). A wireless chip set (39) can also be installed in the smart controller (19) for communication with the second processor (21).

The smart controller (19) can also include a single unit that can perform both cellular and satellite communications.

FIG. 2 also depicts power source (17) for supplying power to smart controller (19). Power source (17) can be any kind of internal or external power source, including one or more batteries, solar panels, fuel cells, generators, or AC/DC sources.

Figure 3:
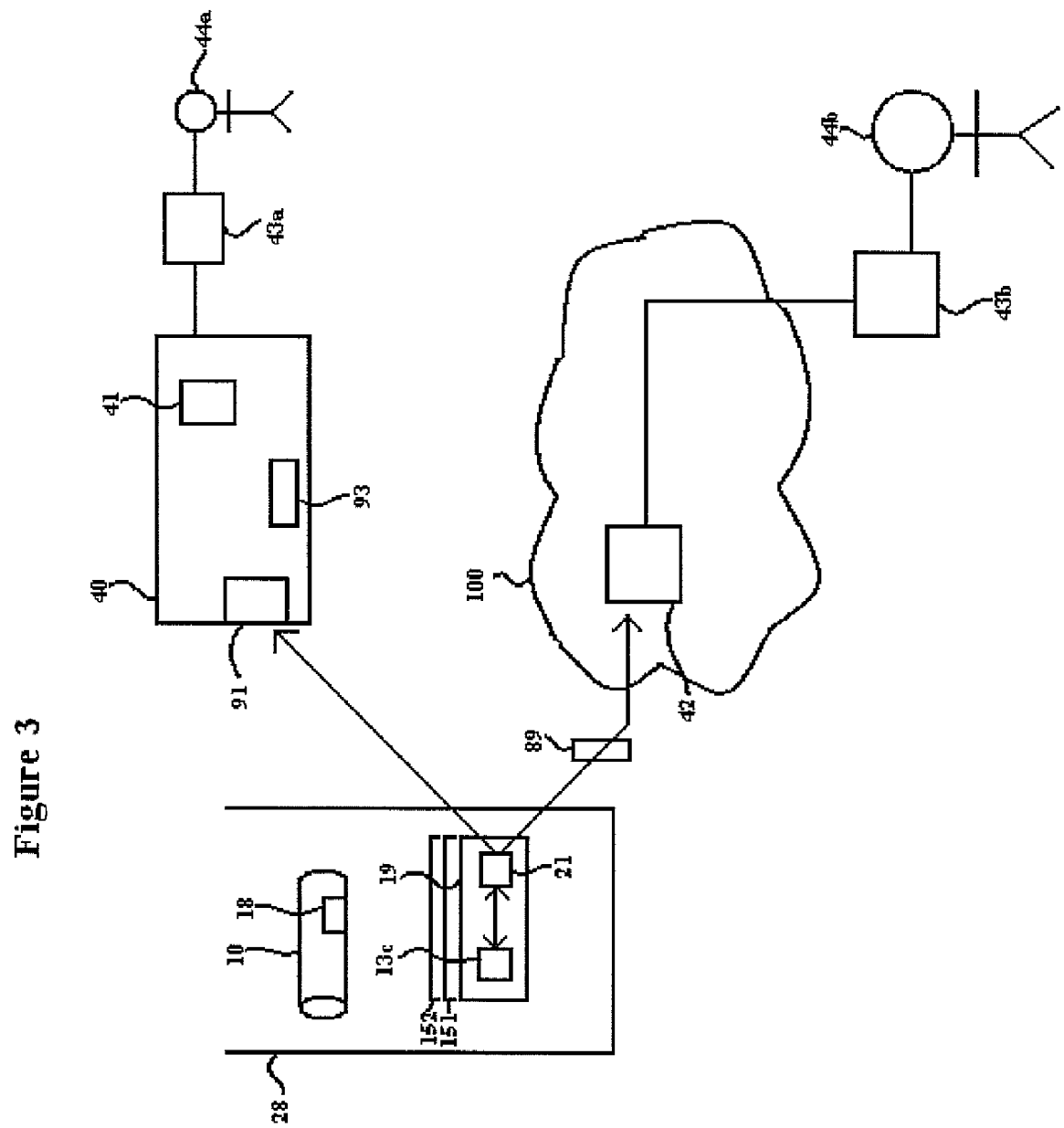
FIG. 3 depicts a diagram showing the parts of the system of FIG. 1 in communication with remote processors.

FIG. 3 depicts a piece of well equipment as traceable well equipment (10), because the RFID tag (18) with information relating to the well equipment has been attached to the well equipment, allowing the well equipment to be traceable. In this embodiment, FIG. 3 depicts a mounting bracket sensor (151) for a mounting bracket (152) for securing the smart controller to the traceable well equipment.

The well equipment can be placed into a shipping device (28), which can be any kind of shipping means including containers for transport on ships, aircraft, cars, trains, and other similar means. Shipping device (28) is depicted as a shipping module or basket for carrying the traceable well equipment (10) with the smart controller (19). Smart controller (19) can be secured to traceable well equipment (10) such as by use of a mounting bracket (152), or smart controller (19) can be shipped individually from traceable well equipment (10).

Smart controller (19) scans the traceable well equipment (10) at periodic intervals during transport and transmits information received from scanning or reading of the RFID tag (18) into the transportable data storage engaged with the smart controller (19).

Once the traceable well equipment (10) reaches a destination site, the second processor (21) of smart scanner (19) can communicate with a third processor (40) at the well construction site. The third processor has another data storage interface (91) for receiving the transportable data storage and enabling downloading of the information to the data storage (41) of the third processor (40). The third processor (40) can further have a wireless chip set (93) for wireless communication with the second processor (21). Use of a wireless chip set (93) can also enable the present method to utilize a third processor (40) that is remote from the well site.

The third processor can have a display (43a). Display (43a) can be viewed by a user (44a) to monitor the status of traceable well equipment (10) instantaneously and in real time at the site.

A fourth processor (42) is also depicted in communication with the second processor (21) via a protocol gateway (89) to a network (100). The fourth processor (42) can be remote from the well site, such as an administrator's computer 100 miles from the site.

The fourth processor can have a display (43b). Display (43b) can be viewed by a second user (44b) to monitor the status of traceable well equipment (10) instantaneously and in real time, remote to the site. Additionally, the user (44a) and second user (44b) can monitor the information simultaneously.

Display (43a) and display (43b) can be a computer monitor, a screen on a cellular telephone or personal digital assistant, or any other type of display or graphical user interface.

While these embodiments have been described with emphasis on the embodiments, it should be understood that within the scope of the appended claims, the embodiments might be practiced other than as specifically described herein.

What is claimed is:

1. A system for continuous asset verification for at least one piece of well equipment using at least one radio frequency identification tag during transport, during storage, at a point of origin, at a destination, or combinations thereof, comprising:
    at least one radio frequency identification tag comprising radio frequency identification tag data storage for receiving information on well equipment, wherein the radio frequency identification tag is removably attachable directly to a plurality of well equipment, thereby forming a plurality of traceable well equipment;
    a first processor separate from the radio frequency identification tag in communication with a first processor data storage for storing at least one piece of information about the at least one piece of well equipment and for communicating the at least one piece of information to the at least one radio frequency identification tag;
    a transportable data storage device for receiving and storing from the first processor the at least one piece of information about the at least one piece of well equipment; and further having a trip plan in the transportable data storage device associated with each piece of well equipment;
    a controller comprising a power source and a second processor, having a second processor memory, adapted to engage with the transportable data storage device, thereby forming a smart controller, wherein the smart controller is adapted for scanning the at least one radio frequency identification tag during at least one predefined interval to detect the at least one piece of information in the radio frequency identification tag data storage during transport of the well equipment, wherein the smart controller further comprises a global positioning system transceiver and a radio frequency identification reader-writer;
    wherein the smart controller further comprises computer instructions for instructing the second processor to map a trip route using the trip plan for locating the smart controller using a mapping software program;
    wherein the second processor further comprises computer instructions for instructing the second processor to use the global positioning system transceiver to synchronize coordinates received by the global positioning system transceiver to the trip plan and to provide at least one time stamp for the plurality traceable well equipment during transport, wherein the at least one time stamp comprises a date, a time, and a set of coordinates;
    a third processor for communicating with the transportable data storage device and storing the at least one piece of information, and further comprising computer instructions for instructing the third processor to provide a notification to a user that the traceable well equipment deviated from the trip plan;
    a fourth processor for receiving the at least one piece of information from the smart controller through a network.

2. The system of claim 1, wherein the at least one radio frequency identification tag is an active radio frequency identification tag comprising a radio frequency identification tag power source and a means for broadcasting within a defined range.

3. The system of claim 1, wherein the third processor further comprises computer instructions for instructing the third processor to generate at least one report on the at least one piece of information.

4. The system of claim 1, wherein the at least one radio frequency identification tag is a tamper resistant radio frequency identification tag.

5. The system of claim 1 wherein the at least one radio frequency identification tag is a reusable radio frequency identification tag.

6. The system of claim 1, wherein the transportable data storage device is an external memory storage device, an internal memory storage device, or combinations thereof.

7. The system of claim 1, wherein the at least one piece of information comprises from three to five types of information, and wherein each type of information is selected from the group consisting of: part number, size, job number, serial number, brand name, color, material, and combinations thereof.

8. The system of claim 1, wherein the smart controller further comprises a wireless transmitter-receiver for communication with the network, a universal serial bus interface, or combinations thereof, and wherein the smart controller is in communication with the global positioning system transceiver and the radio frequency identification reader-writer through the network, the universal serial bus interface, or combinations thereof.

9. The system of claim 8, wherein the at least one network is a local area network, a wide area network, the internet, a cellular network, a wireless fidelity network, or a satellite network, or combinations thereof.

10. The system of claim 1, wherein the smart controller further comprises computer instructions for instructing the second processor to implement a standby or sleep mode to conserve power.

11. The system of claim 1, wherein the smart controller further comprises computer instructions for instructing the second processor to use at least one priority code for mapping the trip route.

12. The system of claim 1, wherein the fourth processor further comprises computer instructions for permitting at least one customer to access the at least one piece of information while the traceable well equipment is in transit, storage, at a point of origin, at a destination, or combinations thereof.

13. The system of claim 12, wherein the fourth processor further comprises computer instructions for providing to the at least one customer a member of the group consisting of: a shipping status, a map presentation of a location of the traceable well equipment, an e-mail notification to a recipient list based on priority codes, or and combinations thereof.

14. The system of claim 1, wherein the power source comprises at least one battery, at least one battery pack, at least one solar panel, at least one fuel cell, or combinations thereof.

15. The system of claim 1, wherein the smart controller further comprises an environmentally resistant housing that is shock proof to at least two gravities, submersible to at least three feet, and able to withstand temperatures up to at least 150 degrees Fahrenheit.

16. The system of claim 1, further comprising a fifth processor for loading the at least one piece of information onto the at least one radio frequency identification tag.

17. The system of claim 1, wherein the destination is a member of the group consisting of: a well location, a work site, a manufacturing location, an assembly location, a storage area, a transport vehicle, or and a holding area.

18. The system of claim 1, wherein the at least one piece of well equipment is a member of the group consisting of: a manufactured bar of material, a tubular, a completion tool, a drilling tool, a buoy, a piece of pressure control equipment, a land well structure, a surface sea well structure, subsea well equipment, a well completion assembly, an oil or gas rig motor, an oil or gas meter, a piece of gas compression equipment, a piece of surface process equipment, or and combinations thereof.

19. The system of claim 1, wherein the at least one radio frequency identification tag further comprises shipping device data, shipping device status flags, payload status flags, or combinations thereof.

20. The system of claim 1, wherein the at least one radio frequency identification tag further comprises a unique number, a shipment manifest number, or combinations thereof for each radio frequency identification tag on the traceable well equipment.

21. The system of claim 1, further comprising a mounting bracket for securing the smart controller to the traceable well equipment, and a mounting bracket sensor located on the mounting bracket, wherein the mounting bracket sensor includes a contact switch disposed on the radio frequency identification tag, providing an alarm to the controller when the at least one piece of well equipment is moved or providing an alarm when the radio frequency identification tag removably attached to the at least one piece of well equipment is removed from the at least one piece of well equipment.

* * * * *